(12) United States Patent
Hunt et al.

(10) Patent No.: US 9,672,449 B2
(45) Date of Patent: Jun. 6, 2017

(54) APPARATUS, SYSTEM, AND METHOD FOR CALIBRATION OF A MEDIA PROCESSING DEVICE

(71) Applicant: ZIH Corp., Lincolnshire, IL (US)

(72) Inventors: Jonathan Hunt, Westport, MA (US); Max Kielland, Vastra Frolunda (SE)

(73) Assignee: ZIH Corp., Lincolnshire, IL (US)

( * ) Notice: Subject to any disclaimer, the term of this patent is extended or adjusted under 35 U.S.C. 154(b) by 39 days.

(21) Appl. No.: 14/612,410

(22) Filed: Feb. 3, 2015

(65) Prior Publication Data

US 2015/0146222 A1 May 28, 2015

Related U.S. Application Data

(62) Division of application No. 13/274,080, filed on Oct. 14, 2011, now Pat. No. 8,982,364.

(51) Int. Cl.
| | |
|---|---|
| *B41J 29/02* | (2006.01) |
| *B41J 29/38* | (2006.01) |
| *B41J 29/46* | (2006.01) |
| *G06K 15/02* | (2006.01) |
| *G06F 3/12* | (2006.01) |

(52) U.S. Cl.
CPC ............ *G06K 15/027* (2013.01); *B41J 29/02* (2013.01); *B41J 29/38* (2013.01); *B41J 29/46* (2013.01); *G06F 3/1219* (2013.01); *G06F 3/1253* (2013.01); *G06K 15/021* (2013.01); *G06K 15/1823* (2013.01)

(58) Field of Classification Search
CPC .................................................. G06K 15/027
See application file for complete search history.

(56) References Cited

U.S. PATENT DOCUMENTS

| | | | | |
|---|---|---|---|---|
| 4,110,020 | A * | 8/1978 | Johnson ................. | G03B 21/11 |
| | | | | 235/462.05 |
| 5,313,564 | A * | 5/1994 | Kafri ....................... | G09C 5/00 |
| | | | | 358/1.1 |
| 2002/0196130 | A1 | 12/2002 | Cheng et al. | |
| 2004/0085594 | A1* | 5/2004 | Kuo .................... | H04N 1/00002 |
| | | | | 358/474 |
| 2009/0267898 | A1 | 10/2009 | Yamamoto et al. | |
| 2010/0092201 | A1* | 4/2010 | Kielland ............... | B41J 29/393 |
| 2011/0211220 | A1 | 9/2011 | Yamada | |
| 2012/0014703 | A1* | 1/2012 | Karasawa ............ | G03G 15/238 |
| | | | | 399/49 |
| 2012/0044535 | A1* | 2/2012 | Samii ..................... | B41J 11/009 |
| | | | | 358/1.15 |

* cited by examiner

*Primary Examiner* — Ibrahim Siddo

(57) ABSTRACT

A method, apparatus, and system for calibration of a media processing device are provided. The method may include providing a calibration sub-routine where the calibration sub-routine includes a plurality of calibration operations to be performed in sequence. The method may further include associating an audible note with each calibration operation and generating the audible note for each calibration operation as each respective calibration operation is performed, where the audible note is generated by a frequency of operation of a motor. The audible note associated with one calibration operation may be different from the audible note associated with another calibration operation.

16 Claims, 5 Drawing Sheets

# APPARATUS, SYSTEM, AND METHOD FOR CALIBRATION OF A MEDIA PROCESSING DEVICE

CROSS-REFERENCE TO RELATED APPLICATIONS

This application is a divisional application of U.S. Non-Provisional application Ser. No. 13/274,080, filed on Oct. 14, 2011, the disclosure of which is hereby incorporated by reference.

TECHNOLOGICAL FIELD

Embodiments of the present invention generally relate to solutions for providing a mechanism by which a media processing device is calibrated to properly function with various types of media. More specifically, the present invention provides an apparatus, system, and method for calibrating a media processing device based upon the media received by the device in order to improve and enhance the media processing operations.

BACKGROUND

Media processing devices, such as printers, may be configured to process multiple kinds of media including substrates such as labels, receipts, cardstock, and cards among many other media types. As different forms of media have different characteristics, each type of media may require the media processing device to implement different calibration settings in order to process the media properly. For example, a label printer may be configured to print on labels of multiple sizes such that the printer may require media size related calibration settings to be appropriately set to accurately and repeatably print on labels of a given size being used in the printer. Similarly, the color of the media substrate may vary between media types and in order to accurately reproduce images, the media processing device may require appropriate color calibration settings in order to compensate for media color variations. Various calibration settings within the media processing device may affect the quality and reliability of the processing operation such that the proper calibration settings may minimize or eliminate errors while enhancing the processing quality. In the case of a media printer, the calibration settings may improve print quality and/or color reproduction, accurately locate the printed image on a media substrate, reduce media waste, etc.

BRIEF DESCRIPTION OF DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

SUMMARY OF THE INVENTION

Figure 1:
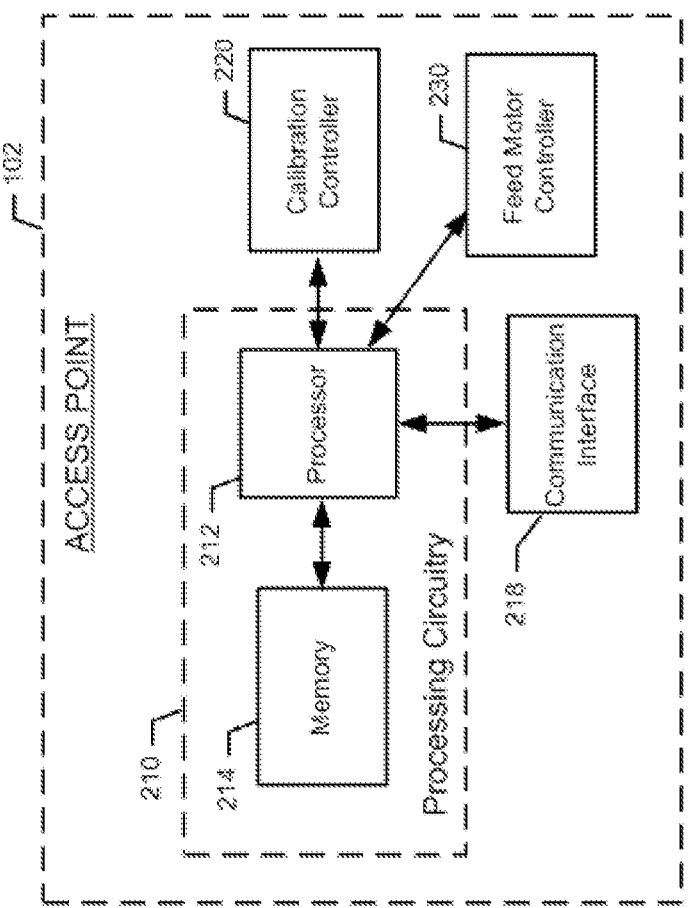
FIG. 1 illustrates a block diagram of an example apparatus for implementing example embodiments of the present invention.

The present invention is directed to an apparatus, system, and method for calibration of a media processing device. Example embodiments of the present invention may include a method of calibrating a media processing device including providing a calibration sub-routine where the calibration sub-routine includes a plurality of calibration operations to be performed in sequence. The method may further include associating an audible note with each calibration operation and generating the audible note for each calibration operation as each respective calibration operation is entered, where the audible note is generated by a frequency of operation of a motor, such as a feed motor. The audible note associated with each calibration operation may be different from the audible note associated with each other calibration operation. The audible note associated with each calibration operation may be a musical note. The audible notes associated with the plurality of calibration operations may collectively form an expected sequence of audible notes when the calibration operations are performed in sequence. The expected sequence of audible notes may be complete in response to the plurality of calibration operations being performed in sequence successfully. The expected sequence of audible notes may be incomplete in response to at least one of the calibration operations not being performed successfully.

Example embodiments of the present invention may include an apparatus where the apparatus includes a controller and a motor, such as a feed motor. The controller may be configured to perform a calibration sub-routine comprising a plurality of calibration operations. The motor may be configured to emit an audible note in response to operating at each of a plurality of frequencies, where the audible note is different for each of the plurality of frequencies. Each of the plurality of calibration operations may be configured to be performed with the motor operating at a particular frequency to generate a particular audible note associated with the calibration operation. The audible note associated with each calibration operation may be different from the audible note associated with each other calibration operation. The audible note associated with each calibration operation may be a musical note. The audible notes associated with the plurality of calibration operations may collectively form an expected sequence of audible notes when the calibration operations are performed in sequence. The expected sequence of audible notes may be completed in response to the plurality of calibration operations being performed in sequence successfully. The expected sequence of audible notes may be incomplete in response to at least one of the plurality of calibration operations not being performed successfully.

Example embodiments of the present invention may include a method for calibrating a media processing device including advancing media past a sensor in a first direction, determining a white-level for the media, determining a black-level for the media based on a first mark on the media; and reversing the media past the sensor in a second direction, opposite the first direction, to determine a mark length based on the first mark on the media. The method may further include advancing the media past the sensor in the first direction in response to determining the mark length. The method may also include determining a page length in response to advancing the media past the sensor in the first direction in response to determining the mark length. The white-level may be verified in response to determining the black level.

Another example embodiment of the present invention may include an apparatus including at least one processor and at least one memory including computer program code, the at least one memory and the computer program code configured to, with the processor, cause the apparatus to at least advance media past a sensor in a first direction, determine a white-level for the media, determine a black-level for the media based on a first mark on the media, and reverse the media past the sensor in a second direction, opposite the first direction, to determine a mark length based on the first mark on the media. The apparatus may further be caused to advance the media past the sensor in the first direction in response to determining the mark length. The apparatus may still further be caused to determine a page length in response to advancing the media past the sensor in the first direction in response to determining the mark length. The apparatus may further be caused to verify the white-level in response to determining the black level.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

The present invention provides an apparatus, system, and method for performing a media calibration procedure in a media processing device. Media processing devices, such as printers, may be configured to print on a variety of media substrates such as tags, labels, receipts, cards, etc. with various size, shape, color, and surface characteristics. The media substrates may be paper, synthetic media, woven or non-woven materials, and may or may not include radio frequency identification (RFID) transponders. Each of these media characteristics may require the adjustment of various media processing device settings in order to optimize media processing quality and minimize waste. While embodiments of the present invention may be used with a number of media processing devices, such as thermal printers, ink jet printers, intermediate transfer media printers, laminators, or the like, example embodiments will be described with respect to thermal printing devices. However, as will be apparent to one of ordinary skill in the art, the apparatus, systems, and methods disclosed herein may be used with any number of media processing devices. The calibration process may be initiated, monitored, or otherwise controlled by a user where the user may include a person initiating the calibration, troubleshooting the media processing device, performing initial set-up of the device at a factory, an installer, a service technician, or any person involved in the operation of the media processing device.

FIG. 1 illustrates a schematic block diagram of controller 102 in accordance with some example embodiments. In this regard, FIG. 1 illustrates an apparatus that may comprise or be employed on a media processing device, such as that illustrated in FIG. 2, and which may be configured to control or perform calibration of a media processing device in accordance with one or more embodiments. However, it should be noted that the components, devices or elements illustrated in and described with respect to FIG. 1 below may not be mandatory and thus some may be omitted in certain embodiments. Additionally, some embodiments may include further or different components, devices or elements beyond those illustrated in and described with respect to FIG. 1.

Referring now to FIG. 1, the controller 102 may include or otherwise be in communication with processing circuitry 210 that is configurable to perform actions in accordance with example embodiments disclosed herein. The processing circuitry 210 may be configured to perform data processing, application execution and/or other processing and management services according to one or more example embodiments. In some embodiments, the controller 102 or the processing circuitry 210 may be embodied as or comprise a chip or chip set. In other words, the controller 102 or the processing circuitry 210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The controller 102 or portion thereof, such as the processing circuitry 210, may therefore, in some cases, be configured to implement an embodiment of the invention on a single chip or as a single "system on a chip." As such, in some cases, a chip or chipset may constitute means for performing one or more operations for providing the functionalities described herein.

In some example embodiments, the processing circuitry 210 may include a processor 212. In some embodiments, such as that illustrated in FIG. 1, the processing circuitry 210 may further include memory 214. However, it will be appreciated that in some example embodiments, the processing circuitry 210 may not include memory 214. The processing circuitry 210 may be in communication with or otherwise control a communication interface 218. As such, the processing circuitry 210 may be embodied as a circuit chip (e.g., an integrated circuit chip) configured (e.g., with hardware, software or a combination of hardware and software) to perform operations described herein. However, in some embodiments, the processing circuitry 210 may be embodied as a portion of a computing device, such as may be implemented on or in operative communication with a media processing device.

The communication interface 218 may include one or more interface mechanisms for enabling communication with other devices and/or networks. In some cases, the communication interface 218 may be any means such as a device or circuitry embodied in either hardware, or a combination of hardware and software that is configured to receive and/or transmit data from/to a network and/or any other device or module in communication with the processing circuitry 210. By way of example, the communication interface 218 may enable sending and/or receiving data to and/or from another device, such as a local or a remote server. In this regard, the communication interface 218 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In some example embodiments, the memory 214 may include one or more non-transitory memory devices such as, for example, volatile and/or non-volatile memory that may be either fixed or removable. The memory 214 may be configured to store information, data, applications, instructions or the like for enabling the controller 102 to carry out various functions in accordance with one or more example embodiments. For example, the memory 214 may be configured to buffer input data for processing by the processor 212. Additionally or alternatively, the memory 214 may be configured to store instructions for execution by the processor 212. As yet another alternative, the memory 214 may include one or more databases that may store a variety of files, contents or data sets. Among the contents of the memory 214, applications may be stored for execution by the processor 212 in order to carry out the functionality associated with each respective application. In some cases, the memory 214 may be in communication with the processor 212, such as via a bus, for passing information among components of the controller 102.

The processor 212 may be embodied in a number of different ways. For example, the processor 212 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In some example embodiments, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA or the like, the processor 212 may be specifically configured hardware for conducting the operations described herein. Alternatively, as another example, when the processor 212 is embodied as an executor of software instructions, the instructions may specifically configure the processor 212 to perform one or more operations described herein.

In some example embodiments, the processor 212 (or the processing circuitry 210) may be embodied as, include, or otherwise control a calibration controller 220. As such, the calibration controller 220 may be embodied as various means, such as circuitry, hardware, a computer program product comprising computer readable program instructions stored on a computer readable medium (for example, the memory 214) and executed by a processing device (for example, the processor 212), or some combination thereof.

The calibration controller 220 may be capable of communication with one or more of the memory 214 or communication interface 218 to access, receive, and/or send data as may be needed to perform one or more of the functionalities of the calibration controller 220 as described herein.

Width Detection

Embodiments of the present invention may be configured to perform a calibration sub-routine to accurately calibrate the calibration settings of a media processing device for the media to be received therein. One calibration setting may include the media width for which the media processing apparatus is configured to calibrate the media width based on the detected width of the media or the detected width of an adjustable media guide configured to guide the media into the media processing device.

In an example embodiment of width detection, the media processing device may include one or more sensors, in communication with controller 102, that may be used to detect the width of media as it is fed or inserted into the media processing device. The sensors may include infrared (IR) reflective sensors that may be sampled, for example, as 8-bit A/D count values by the width detection calibration sub-routine. The sensors may detect the location of a media guide or the physical presence of the media. In such an embodiment, the media processing apparatus may be able to detect a narrow or wide media substrate as it is fed or inserted into the media processing device. In an example embodiment in which there are two standard media widths (e.g., a narrow width and a wide width), two sensors may be used in concert to calibrate the media width calibration setting and to determine if an error exists with the media presence or media width.

Figure 2:
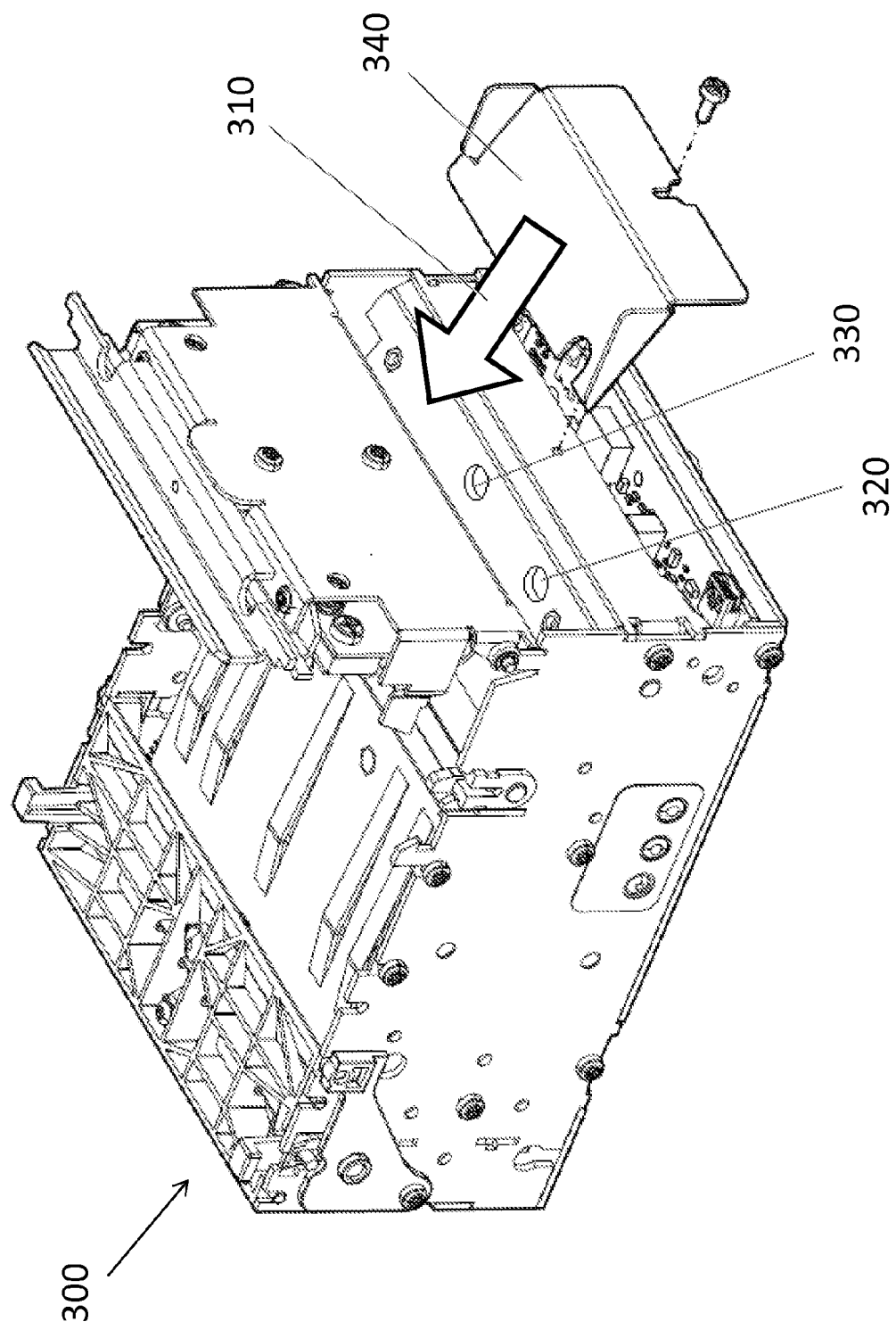
FIG. 2 illustrates an example embodiment of a media processing device according to embodiments of the present invention.

One method with which the two sensors may work in concert to calibrate the media width is through detecting or sensing whether or not media is present at one or both of the sensors as illustrated in the table below. FIG. 2 illustrates a media processing apparatus 300 including a media processing path 310, proximate which are media sensor one 320 and media sensor two 330. Optionally, the media processing device 300 may include a removable/replaceable media guide 340. Media sensor one 320 and media sensor two 330 may be configured to detect the presence of media and/or the presence of a media guide 340. The media guide 340 may be available in multiple widths, each width corresponding to a respective media width. Table 1 below illustrates example sensor readings from media sensor one 320 and media sensor two 330 and media detection conclusions that may be drawn from the example sensor circuitry. The media sensor 320 and media sensor 330 may be proximity sensors, infrared reflective sensors, or suitable sensor that may detect the presence of media or a media guide.

TABLE 1

| Sensor one State (Wide) | Sensor two State (Narrow) | Conclusion |
|---|---|---|
| Media Present | Media Not Present | Error - Sensor 2 defective |
| Media Present | Media Present | Wide Media detected |
| Media Not Present | Media Not Present | No Media detected |
| Media Not Present | Media Present | Narrow Media detected |

The detection of media only at sensor two corresponds to a narrow media being detected while detection at both sensor one and sensor two corresponds to a wider media substrate being detected and overlaying both media sensors. As a wide media guide 340 may be configured to overlay the narrow media sensor (sensor two 330), the presence of media is detected in the same manner as the detection of a media guide at sensor two. With present/not-present functionality, the controller is not capable of differentiating between media presence and media guide presence at sensor two. While Table 1 illustrates a use of sensor one 320 and sensor two 330 in a present/not-present fashion, further detail regarding the media width calibration setting may be determined using the sensor transition for each of sensors one and two (e.g., when the sensor changes from no-detection to a detection state) when media is initially loaded or when the media is exhausted and no longer detected. Table 2 illustrates additional functionality when using the transition detection at sensor one 320 and sensor two 330. In the example embodiment using detection of a transition at sensor one and sensor two, the controller may be able to differentiate between media presence and media guide presence, thereby using existing hardware to enhance the media processing device functionality.

TABLE 2

| Sensor one State | Sensor two State | Sensor one Transition | Sensor two Transition | Conclusion |
|---|---|---|---|---|
| Not present | Not present | Present | Present | No Guide, Wide Media |
| Not present | Not present | Not present | Present | No Guide or Guide, Narrow Media |
| Not present | Present | Present | Present | Wide Guide, Wide Media Load |

In order to determine when the media is out, the calibration sub-routine may use a single sensor to detect when the media is no longer present. The single sensor used may be determined based upon the signals seen at sensor one and sensor two as outlined above. For example, when narrow media is detected, the calibration sub-routine may rely upon sensor two 330 to determine if the media is out. When wide media is used, either sensor one 320 or sensor two 330 may be used to determine if the media is out. When wide media is used with a wide media guide, sensor one 320 may be used to determine if media is out.

However, the condition may arise in which the media is out and the controller 102 does not detect the media out condition. For example, if the media processing device is configured with a narrow media guide 340 (where media sensor two detects the guide present), such a configuration may use sensor two for the media out sensor. Should a wide media guide be later installed, the sensor two may be obscured by the wide media guide and sensor two may not accurately detect a media out condition. Because there is no detectable difference between the media guide and the media, the controller may believe that media is present. As media is found to be present, the media width calibration sub-routine may not be initiated and the media out functionality may be lost. For this reason, a user may manually initiate the media width calibration through a key sequence.

Media Sensing Calibration

Example embodiments of the present invention may include an apparatus, system, and method by which information about the media used, or to be used, is measured and stored (e.g., in memory 214) through a media calibration sub-routine performed, for example, by calibration controller 220. The proper measurement and gathering of this media information may be critical for the controller to properly discern how to work with the media that is selected.

The media calibration sub-routine may begin when the media processing device detects a "media out" condition (as outlined above) where there is no longer any media being inserted or fed along a feed path or processing path of the media processing device 300. The detection of the media out condition can be determined by the media processing device actively sensing that the media is out (e.g., through the use of media sensors 320 and 330 disposed on or proximate the feed path) or via manual input from a user, such as through a key sequence. The media sensors 320 and 330 may measure the presence of media through raw A/D counts, such that a valid range may be from 20 counts to 255 counts.

The media calibration sub-routine may be initiated when the print head is in a closed state. When the print head is in a closed state, and the media out condition has been detected, the media calibration sub-routine may be initiated upon detection of media (e.g., through the use of the media sensors used to determine the media out condition, as described above). The controller may monitor the media sensors through a transition from a low value (e.g., an A/D count value of 50 or less) to a higher value. The value detected through the media sensors prior to the transition from the low value to the high value may be established (e.g., calibrated) as the end-of-media threshold calibration setting, thereby assuming that the low value means that no media is present. A variance may be included in the end-of-media threshold to minimize erroneous "media out" warnings. The end-of-media threshold may be the value sensed by the media sensor prior to the transition to a high value, where the threshold includes a variance of −30 counts to +10 counts, for example.

Optionally, the end-of-media threshold may be a user adjustable setting within the memory 214 of the controller 102. If an invalid value is specified by the user (e.g., a value below 20 counts or above 255 counts), the previously loaded value (stored in memory 214) may be used. If the value stored in the memory 214 is invalid, a default value may be used, such as 200 counts. The default value may also be user configurable. The value stored by the media calibration sub-routine for the end-of-media threshold calibration setting may be represented as:

$$eop\text{Thresh}=t0pl-10$$

Where eopThresh is the end-of-media threshold value in A/D counts and t0pl is the actual measured value for the "end of media." This may position the high threshold for the end-of-media system 10 A/D counts closer to the media than is actually detected (e.g., the end of media equation incorporates an offset).

Upon detection of the media and calibration of the end-of-media threshold calibration setting, a time delay may be implemented. The time delay, for example, 1.5 seconds, may be implemented to give a user time to advance or insert the media forward to a platen roller or feed roller within the media processing device to properly position the media for operation of the media processing device.

While the above media calibration sub-routine has been described with respect to calibration in response to detection of media with the media sensors, it may be desirable for the media calibration sub-routine to be initiated without the presence of media. In such an embodiment, a second calibration process may be performed, possibly at the point of manufacture of the media processing device. The media processing device may be configured with a media guide (e.g., media guide 340 of FIG. 2). The controller 102 of the media processing device 300 may use sensors 320 and/or 330 to detect the width of an installed media guide. The sensors may, for example, be infrared (IR) reflective sensors that are sampled as 8-bit A/D counts by the controller to determine the media guide width calibration setting. This process of calibration of the media guide width may be performed without media such that an accurate measure of the media guide is achieved. The media calibration sub-routine for the media guide width calibration may also serve to calibrate a cutter (e.g., the width of cut required to cut the media) and detect the installed media guide. An advantage to a media calibration sub-routine that does not require media to be present to be initiated may include remote execution of a command version of calibration. In some cases it might be desirable to initiate calibration from a remote location which may be achieved with a calibration sub-routine that does not require media to be present as disclosed herein.

Media Type Calibration

Example embodiments of the present invention may include an apparatus, system, and method by which information about the media used, or to be used, is measured and stored in a media calibration sub-routine, which may be performed by calibration controller 220. The proper measurement and gathering of this information may be critical for the controller to properly discern how to process the media that is selected. Two example media types that may be used in a media processing device according to the present invention may include continuous media (e.g., media that is a continuous, unmarked web substrate) and mark media (e.g., media that is prepared as a single substrate and marked between forms or sections of the substrate). In such an example, a user may enter the type of media they are using into the controller 102, using a user interface that may be implemented on the media processing device or a user input that is configured to communicate with the controller via the communications interface 218, such that a media calibration sub-routine configured for that specific media may be appropriately executed.

Figure 3:
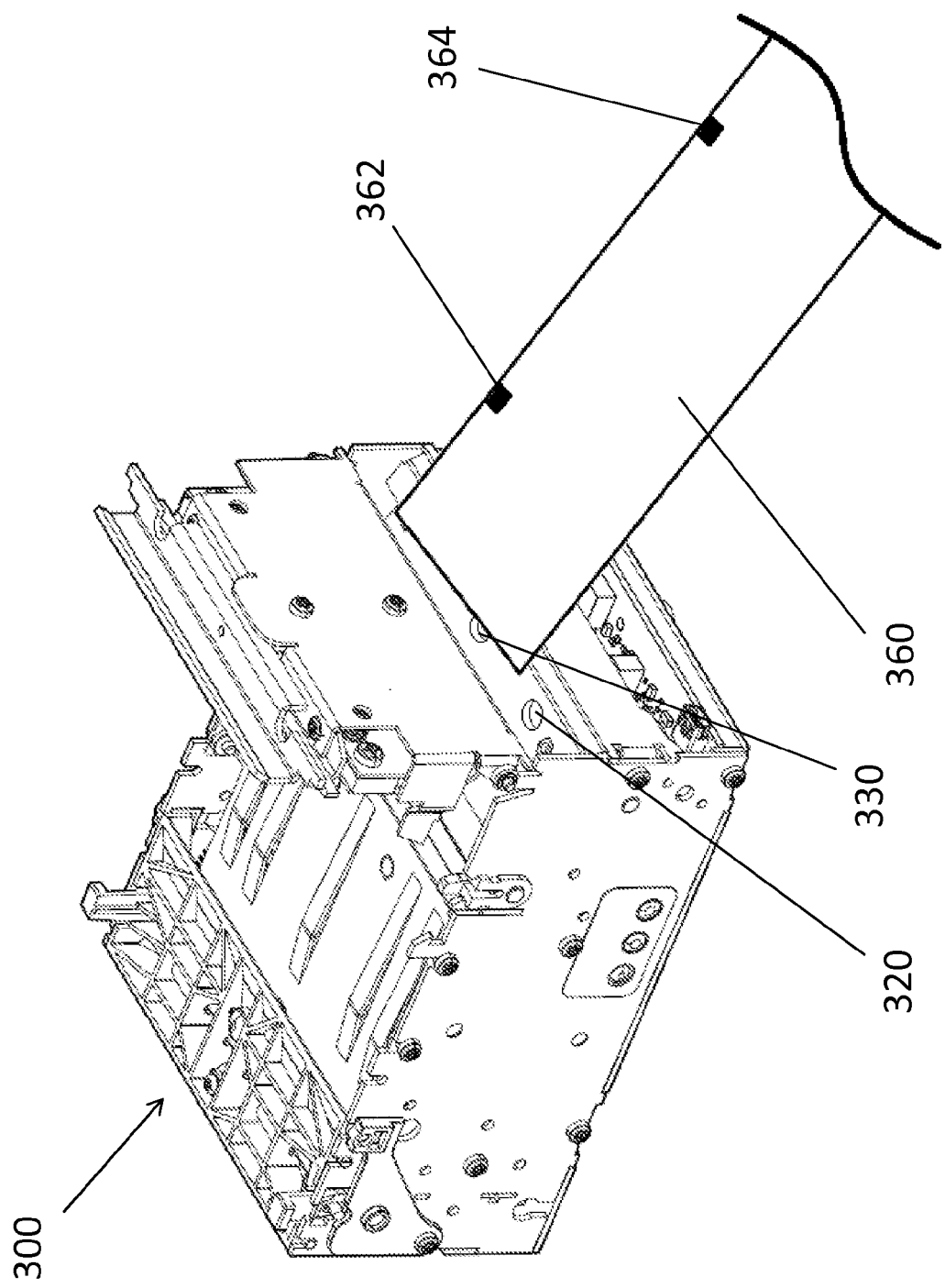
FIG. 3 depicts an example embodiment of marked media as may be processed by example embodiments of the present invention.

FIG. 3 illustrates an example embodiment of a media processing device 300 receiving a web of marked media 360. The marked media 360 includes marks 362 and 364. The marks may be disposed on the printed, non-printed, or both sides of the media web 360. The marks 362, 364, may provide reference points from which processing, cutting, and presenting of the media is measured. The illustrated embodiment of a marked media web 360 is shown partially obscuring the narrow media sensor 330 while not obscuring the wide media sensor 320. As such and as outlined above, the media processing device 300, through the media width calibration sub-routine, may recognize the media as narrow media.

Example embodiments of a media calibration sub-routine may include the calibration of several settings. For example, the media calibration sub-routine may include a white-level calibration, an out-of-paper level calibration, and a top of form (TOF) marker sensitivity calibration. When continuous media is selected, the media calibration sub-routine may be limited to calibration of the white-level which is recognized as the value that the controller 102 has determined is a reliable indication of the whiteness of the media sampled over a number of steps, where a "step" is an incremental movement of a feed roller or platen roller within the media processing device.

In order for a white-level calibration value to be considered stable, the value should not vary more than 20 A/D counts over the sampling period and the value should not fall below the end-of-media threshold outlined above. In an example embodiment, the white-level of the media may be sampled over 75 steps of media using a white-level sensor disposed along the media feed path configured to read the reflectivity, emissivity, or white-level of the surface of the media substrate. In such an embodiment, the feed motor may feed the media a predetermined print speed such that sampling occurs after each step. Should the value vary more than 20 A/D counts over a predetermined distance, such as 15 mm of media, the sampling process may restart as the consistency of the white-level value may be deemed suspect.

Upon achieving a stable calibrated value for the white-level, two additional parameter settings may be configured. The first calibration setting may be the end-of-media threshold as outlined above. If an invalid value for the end-of-media threshold is stored in the memory, such as memory 214 of the controller 102, a default value of 255 may be used. This parameter may be used as part of a system to detect the difference between a black-mark on the media and a media-out condition.

The second parameter setting may be the "Top-of-Form marker sensitivity" or TOF marker sensitivity calibration setting which may be a user adjustable setting within the system. The TOF marker sensitivity setting is used to determine if a black mark is detected on the media. The TOF marker sensitivity calibration setting may be measured in A/D counts with a valid range of 0 counts to 255 counts. If an invalid value is stored in the memory, such as memory 214 of the controller 102, a default value of 120 may be used. When the system internally queries to determine if the white-level sensor is over a black mark, the returned A/D count value of the selected sensor is compared to the TOF marker sensitivity. If the A/D count value is above the TOF marker sensitivity, a black mark is assumed present at the white-level sensor. If the A/D count value is below the TOF marker sensitivity, no black mark is detected at the sensor. In continuous media calibration, the TOF marker sensitivity may be set with the following formula:

$$sens = wMax + \frac{tOpl - wMax}{2}$$

Where sens is the TOF marker sensitivity, wMax is the highest value detected at the white-level sensor during the white-level verification procedure and tOpl is the A/D count level detected as the media out level during the initial media present calibration operation. This formula effectively sets the level at which a black mark is detected. In a typical white media calibration case, with a wMax value of 222 and a tOpl value of 26, the TOF Marker Sensitivity is 124. An AD level above this level would be detected as a TOF mark.

While black mark sensing is not necessary when using continuous media, such a calibration process and calibration parameter settings may be used if marked media is used without recalibrating the system or if the user-setting to determine continuous media or mark media is improperly selected.

In an example embodiment wherein mark media is selected, top-of-form (TOF) synchronization calibration sub-routine may be enabled. The TOF synchronization may include white-level detection as outlined above; however, as a continuous substrate of a consistent white-level is not anticipated, the distance over which the white-level is calibrated may be increased to a distance such as 37.5 mm rather than a shorter distance, such as 15 mm, for continuous media. The selection of the increased distance may be predicated on the absolute maximum TOF black mark length, which may be approximately 32 mm.

The media calibration sub-routine for marked media may differ from the media calibration sub-routine for continuous media if the calculated white-level is greater than the detected out-of-paper level, meaning that end-of-media threshold is "brighter" than with paper present. In such an example, the end-of-media threshold level may be re-calculated with the following formula:

$$opl = wMin + \frac{wMin - tOpl}{2}$$

Where wMin is the lowest value detected during the white-level verification procedure and tOpl is the A/D count level detected during the media out level during the width analysis calibration operation.

Upon completion of the white-level calibration, the media calibration sub-routine may initiate a mark calibration sequence. The mark calibration sequence may begin with feeding the media along the media processing path (e.g., path 310 of FIG. 2) until a transition from the white-level to a black mark is detected at the white-level sensor. In such an embodiment, the controller 102 may be configured to anticipate the detection of a transition to a darker mark detected at the white-level sensor. If the white-level sensor encounters a transition to a brighter mark, the white-level verification sequence may be requested again as the calibrated white-level value may be suspect. The detection by the controller 102 of an increased white-level when anticipating a black mark may cause the controller 102 to generate an error message indicative of the issue and present this error message to a user or to another device, such as a printer server, network device, accessory, indicator light, internal data bus, as a hardware handshake, etc. This error may be considered informational as the media calibration sub-routine may continue without user intervention until a maximum calibration time and/or length is achieved without successful completing the media calibration sub-routine.

Upon the white-level sensor encountering a transition from the white-level to a darker area, indicative of a black mark or TOF mark, the mark calibration sequence, as implemented by the controller 102, may begin sampling the black mark with the white-level sensor to determine a black-level. From the samples taken across the black mark, the lowest A/D count value, or darkest level, is preserved. The sampling may continue until the sensor detects a value that is within the original bounds found during the white-level analysis indicating that the sensor is beyond the black mark.

The mark sensitivity may then be set using the following equation:

$$sens = \left(wMin + \frac{wMax - wMin}{2}\right) + \left(bmMin - \frac{\left(wMin + \frac{wMax - wMin}{2}\right)}{5}\right) * 2$$

Where sens is the mark sensitivity, wMax is the highest value detected during the white-level verification procedure, wMin is the lowest value detected during the white-level verification procedure, and bmMin is the minimum value detected over the black mark. The parenthetical calculations involving wMin and wMax are simply a formula to find the center of the detected white-level, and the division by five and multiplication by two position the sensitivity between the bmMin and the verified white-level.

The media calibration sub-routine may then continue to feed media using the established sensitivity value to determine the next black mark. Once the next black mark is found, the size of the black mark may be sampled by counting each step that is at least as dark as the sensitivity value established above.

Once the A/D count value read by the white-level sensor is less than the above value (e.g., the end of the mark is reached), the black mark length is set. Another parameter, serving as a "garbage filter," may also be set at this time. The garbage filter may be user adjustable and may be measured as a distance, such as in millimeters. The function of the garbage filter setting is to determine what amount of mark-level activity on the sensor is too small to be considered a valid mark. If a mark that is in the detection process is detected to be shorter than the garbage filter, the mark is ignored. Conversely, a maximum black mark length is also established such that a mark that is larger than the maximum black mark length is interpreted as an out-of-media condition. The garbage filter may be set using the following formula:

$$garb = \left(\frac{markLen}{5}\right) * 2$$

Where garb is the garbage filter value and markLen is the detected length of the black mark. This formula positions the garbage length just below half the length of a valid mark.

The media calibration sub-routine may then calibrate the page length calibration setting. In such an embodiment, the media may be fed forward until a valid mark is detected. At this time the media out detection may be running as well as the black mark detection such that the media processing device may be capable of determining if the media runs out. If the next mark is detected before the page length is the distance from the media sensor (e.g., media sensor one 320 or two 330) to the cut line (e.g., the line at which the media is cut within the media processing device), the page is considered invalid and a new page length calculation may be started. This allows media with dual-section marks, such as boarding passes, to be used provided the first mark distance is less than the media sensor to cut line distance. In response to the next mark being found, the page length setting may be calibrated.

Reduced Media Consumption During Calibration

Example embodiments of the present invention may consume less media to complete the calibration sub-routine procedure than standard calibration procedures. A flowchart illustrating operations performed by, or in relation to a method of an example embodiment is presented in the flowchart of FIG. 4. It will be understood that each block of the flowchart, and combinations of blocks in the flowchart, may be implemented by various means, such as hardware, a computer program product comprising a computer readable medium storing program instructions (e.g., software, firmware, and the like), processor, circuitry and/or other device. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus embody means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, and combinations of operations for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

Figure 4:
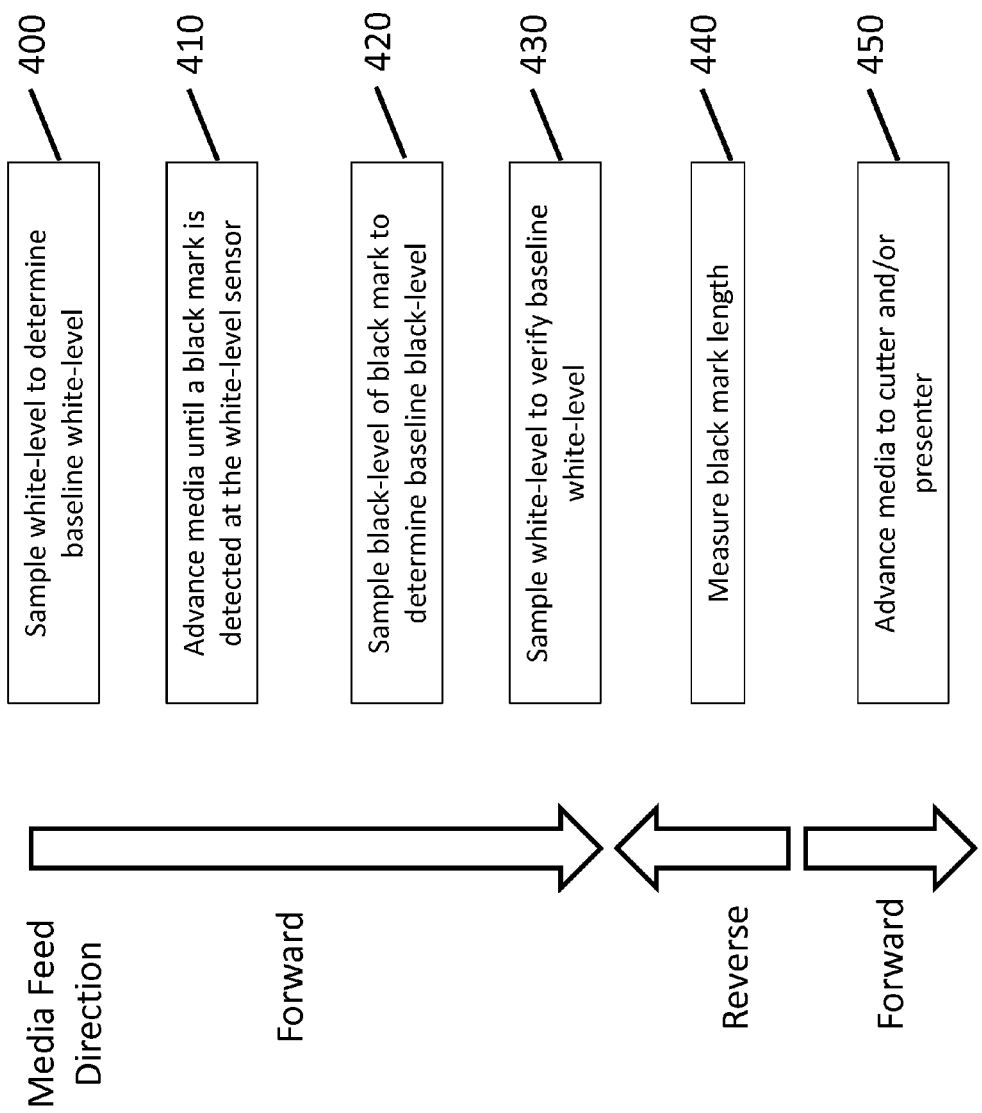
FIG. 4 is a flowchart illustrating operations performed by an example embodiment of a method according to the present invention.

In an example embodiment, an apparatus for performing the methods of FIG. 4 may comprise processing circuitry (e.g., processing circuitry 210) configured to perform some or each of the operations (400-450) described below. The processing circuitry may, for example, be configured to perform the operations (400-450) by performing hardware implemented logical functions, executing stored instructions, or executing algorithms for performing each of the operations. Additionally or alternatively, the apparatus may comprise means for performing one or more of the operations described above. In this regard, according to an example embodiment, examples of means for performing operations 400-450 may comprise, for example, the processing circuitry 210, the processor 212, memory 214 and/or a device or circuit for executing instructions or executing an algorithm for processing information as described further below.

The calibration sub-routine involving marked media may initially advance media past the platen roller or feed roller to ensure the media is fully engaged by the platen roller or feed roller. In some example embodiments, the calibration sub-routine may then substantially follow the steps outlined above and further described herein with respect to the flowchart of FIG. 4 with the media feed direction for each flowchart operation illustrated by the illustrated arrows. The calibration sub-routine may sample white-level of the media to establish a baseline white-level and ensure a variation of less than a predefined threshold to ascertain the white-level of the media at 400. The media may then be advanced until a black mark is detected at the white-level sensor at 410. The calibration sub-routine may then determine the black-level of the black mark at 420 and verify the white-level after the black mark is found at 430. Once the white-level baseline is found, the black mark is found, the black-mark level is found, and the post-black mark white-level is verified, the motor may operate in reverse such that the previously measured black mark (initially measured for black level), is measured again for the size of the black mark at 440. This re-use of the same black mark for multiple steps of the calibration sub-routine reduces the amount of media consumed by not advancing the media to the subsequent black mark. Once the black mark length is established, the media may then be advanced to the cutter and/or the presenter at 450 to be cut and/or ejected, leaving the next media substrate ready for processing.

Audible Confirmation of Calibration

During the media calibration sub-routine which includes a plurality of calibration operations, the process may fail or stop at any calibration operation due to a variety of problems. As it may be difficult for a user to diagnose the point-of-failure of the calibration sub-routine, a mechanism by which the user is alerted to the specific operation of the calibration sub-routine may be desirable.

Provided herein is an example embodiment of a method for alerting a user as to the progress of the calibration sub-routine. Each calibration operation within the calibration sub-routine may be assigned an audible note where the audible note may be generated by operating a motor of the media processing device, such as the media processing device's feed motor, at different frequencies during the calibration sub-routine. In an example embodiment in which the motor is a stepper motor, a signal to drive the motor is embodied as a wave with a frequency of phase changes (from low to high) such that each phase change is a step of the motor. The frequency with which these phase changes occur affect the speed of the driven motor and also may produce an audible tone at the driven frequency. As varying the frequency of operation of the feed motor may affect the speed at which the calibration sub-routine is performed, in some example embodiments, the calibration sub-routine logic may be independent of time or duration. Optionally, if the calibration sub-routine logic employs a time component, the time component may be adjusted to accommodate the variation in feed motor speed introduced by operation of the feed motor at various frequencies.

Figure 5:
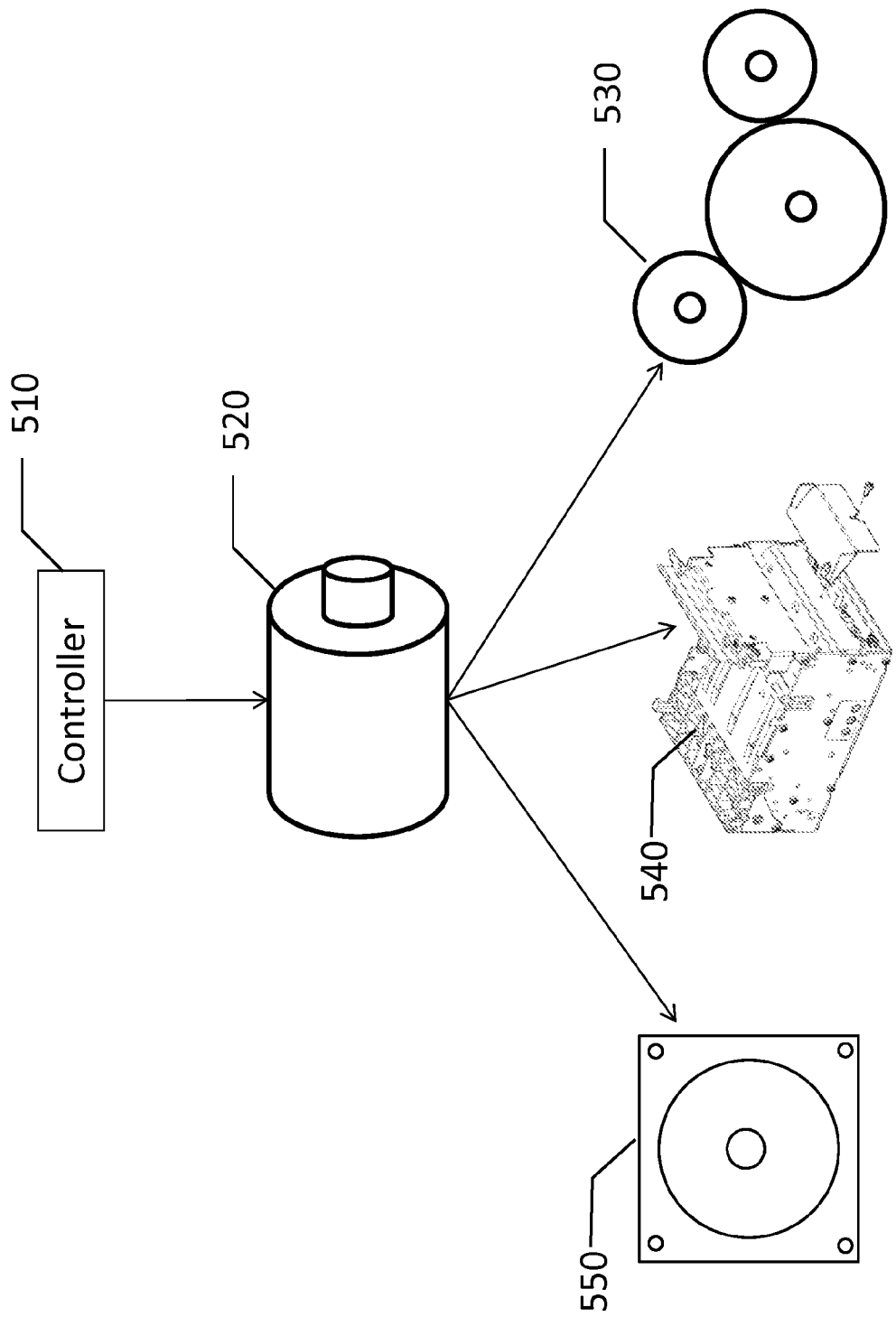
FIG. 5 is a schematic representation of a media processing device configured to generate an audible note according to an example embodiment of the present invention.

The audible notes may be generated by driving the phase changes to the feed motor at a rate or frequency equivalent to the desired pitch. A stepper motor, for example, may be driven with a signal that includes a phase change from a high state to a low state, each transition to a high state representing a step of the motor. Thus, the frequency of the phase change corresponds to a speed of operation of the stepper motor. The frequency of the phase change of the motor may produce vibrations of the desired frequency which may propagate through parts of the feed motor or components attached thereto making the notes audible. For example, the phase change frequency of the motor may produce vibrations in the motor case and spindle, which in turn may propagate through a gear train thereby making the note audible. Optionally, a note-generating component may be attached to the motor or proximate thereto which may resonate at the operating frequencies of the feed motor to produce the audible notes. Such a note-generating component may be a diaphragm or other component capable of converting the phase change frequencies of the motor into an audible note. FIG. 5 illustrates a schematic diagram of example embodiment of the generation of an audible note within a media processing device. The motor 520 is driven by the controller 510 at a specific phase change frequency corresponding to a desired audible note. While the motor 520 may or may not include sufficient structure to generate an audible note, additional components of the media processing device may further propagate and enhance the volume of the note to create a more audible note. For example, the driven motor 520 may propagate the phase frequency through a gear or gear train 530 which may enhance the audible note. Additionally or alternatively, the driven motor 520 may cause a portion of the housing 540 to resonate at the driven frequency to create the audible note. Additionally or alternatively, the driven motor 520 may further cause a diaphragm 550 or other structure to resonate at the driven frequency, thereby producing the audible note. While components such as the housing 540, the gear train 530, or the diaphragm 550 may enhance or increase the volume of an operating frequency of the motor 520, such components generally do not substantially change the audible tone generated.

An example of the audible notes as applied to phases of the calibration process are summarized below in Table 3, which illustrates example calibration operations of the calibration sub-routine of marked media, in accordance with some example embodiments.

TABLE 3

| Operation Name | Description | Musical Note |
|---|---|---|
| Advance Media | Advance the paper 10 mm past the platen to ensure it is fully under platen control | G (392 hz) |
| White Balance | Sample white area of media for 15 mm, must not swing more than 20 AD steps, if it does, restart phase | B (493 hz) |
| Search Blackness | Find any black more than .5 v higher than the white balance, find the peak. | D (587 hz) |
| Verify White Balance | Search for the media levels found by white balance again | C♯ (554 hz) |
| Search Next BM | Reverse Motor Direction, scan for the mark again | D (587 hz) |
| Measure BM Size | Motor still reversed, measure the size of the mark | D (587 hz) |
| Find Page Size | Forward Motor direction, find the next mark to measure distance between marks | High G (783 hz) |
| Reset Paper | Advance distance between head and cutter to synchronize, cut and eject. | Normal Motor Operation based on speed settings |

As shown above, operations of an example calibration process and calibration sub-routine are identified by the "operation name", a brief description of the calibration operation is provided under "description," and an example frequency of the audible note generated is identified. The frequencies selected may be user selected or may be fixed. The frequencies are preferably within a commonly audible range and may be sequenced to form a recognizable, expected sequence of audible notes such as a tune for which any note omissions are readily apparent to a user. For example, the audible notes may form an evenly-stepped sequence with a frequency increase to the next higher note at each phase. Any note omissions would be apparent to a user as would any stoppage prior to completing the musical sequence.

Table 4 below illustrates named musical notes that correspond to particular frequencies; however, an infinite number of notes exist across the range of audible frequencies, most without a musical note name. The table below is merely representative of commonly recognized musical notes that may be used in example embodiments of the present invention.

TABLE 4

| Notes | Frequency (octaves) | | | | |
|---|---|---|---|---|---|
| A | 55.00 | 110.00 | 220.00 | 440.00 | 880.00 |
| A♯ | 58.27 | 116.54 | 233.08 | 466.16 | 932.32 |
| B | 61.74 | 123.48 | 246.96 | 493.92 | 987.84 |
| C | 65.41 | 130.82 | 261.64 | 523.28 | 1046.56 |
| C♯ | 69.30 | 138.60 | 277.20 | 554.40 | 1108.80 |
| D | 73.42 | 146.84 | 293.68 | 587.36 | 1174.72 |
| D♯ | 77.78 | 155.56 | 311.12 | 622.24 | 1244.48 |
| E | 82.41 | 164.82 | 329.64 | 659.28 | 1318.56 |
| F | 87.31 | 174.62 | 349.24 | 698.48 | 1396.96 |
| F♯ | 92.50 | 185.00 | 370.00 | 740.00 | 1480.00 |
| G | 98.00 | 196.00 | 392.00 | 784.00 | 1568.00 |
| A♭ | 103.83 | 207.66 | 415.32 | 830.64 | 1661.28 |

Table 5 illustrates example calibration operation of the calibration sub-routine of plain or continuous media.

TABLE 5

| Phase Name | Description | Musical Note |
|---|---|---|
| Advance Media | Advance the paper 10 mm past the platen to ensure it is fully under platen control | G (392 hz) |
| White Balance | Sample white area of media for 15 mm, must not swing more than 20 AD steps, if it does, restart phase | B (493 hz) |
| Reset Paper | Feed 92 mm | Pitch sweep from 493 hz to 783 hz (B to G) |

As illustrated in Table 5, the "reset paper" operation of the calibration sub-routine includes a pitch sweep which may further enable a user to better determine the current calibration operation. Should the media processing device stop in the process of the pitch sweep, the degree to which the reset paper calibration operation was complete may be evident by the last pitch heard (e.g., the lower the pitch, the less progress through the reset paper calibration operation).

Varying the frequency with which a motor is driven may create undesirable effects, particularly when the frequency generated is a resonant frequency which causes components of the media processing device to resonate or vibrate at a frequency that may be detrimental to printing, such as a frequency which resonates to the point of causing chatter (e.g. undesirable vibration of the printhead, platen, or media which may degrade print quality). Applicant has identified a number of acceptable motor operating speeds which correspond to phase change frequencies which may be employed without detrimental effects to generate audible tones that may communicate the calibration operation by virtue of association of each calibration operation with a frequency. Such audible tones generated by components of a media processing device operating within acceptable ranges of speeds and frequencies may produce the additional benefit of alerting a user as to the current calibration operation of a media processing device and alert a user of a faulty calibration operation in the event the calibration sub-routine does not properly complete.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

That which is claimed:

1. A method for calibrating a media processing device, the method comprising:
   advancing media past a sensor in a first direction;
   determining a white-level for the media;
   determining a black-level for the media based on a first mark on the media; and
   advancing the media past the sensor in a second direction, opposite the first direction, to determine a valid mark threshold length based on the first mark on the media; and
   after determining the valid mark threshold length:
      advancing the media past the sensor in the first direction; and
      comparing the valid mark threshold length to a length of a second mark on the media.

2. The method of claim 1, further comprising determining a page length in response to advancing the media past the sensor in the first direction in response to determining the valid mark threshold length.

3. The method according to claim 1, further comprising verifying the white-level in response to determining the black level.

4. The method according to claim 1, wherein determining the white-level for the media is performed as the media is advanced past the sensor in the first direction.

5. The method according to claim 4, wherein determining the black-level for the media based on the first mark on the media is performed as the media is advanced past the sensor in the first direction.

6. The method according to claim 1, wherein determining the black-level for the media based on the first mark on the media is performed in response to the sensor encountering the first mark on the media as the media is advanced in the first direction.

7. The method according to claim 6, wherein the media is advanced in the second direction in response to the sensor detecting the end of the first mark as the media is advanced in the first direction.

8. The method according to claim 1, further comprising, after determining the valid mark threshold length, advancing the media in the first direction in response to reaching an end of the first mark.

9. An apparatus comprising at least one processor and at least one memory including computer program code, the at least one memory and the computer program code configured to, with the processor, cause the apparatus to at least:
   advance media past a sensor in a first direction;
   determine a white-level for the media;
   determine a black-level for the media based on a first mark on the media; and
   reverse the media past the sensor in a second direction, opposite the first direction, to determine a valid mark threshold length based on the first mark on the media; and
   after determining the valid mark threshold length:
      advance the media past the sensor in the first direction; and
      compare the valid mark threshold length to a length of a second mark on the media.

10. The apparatus of claim 9, wherein the apparatus is further caused to determine a page length in response to advancing the media past the sensor in the first direction in response to determining the valid mark threshold length.

11. The apparatus according to claim 9, wherein the apparatus is further caused to verify the white-level in response to determining the black level.

12. The apparatus of claim 9, wherein causing the apparatus to determine the white-level for the media is performed as the media is advanced past the sensor in the first direction.

13. The apparatus according to claim 12, wherein causing the apparatus to determine the black-level for the media based on the first mark on the media is performed as the media is advanced past the sensor in the first direction.

14. The apparatus according to claim 9, wherein causing the apparatus to determine the black-level for the media based on the first mark on the media is performed in response to the sensor encountering the first mark on the media as the media is advanced in the first direction.

15. The apparatus according to claim 14, wherein the apparatus is further caused to advance the media in the second direction in response to the sensor detecting the end of the first mark as the media is advanced in the first direction.

16. The apparatus according to claim 9, wherein the apparatus is caused to, after determining the valid mark threshold length, advance the media in the first direction in response to reaching an end of the first mark.

* * * * *